United States Patent
Katsuki et al.

(10) Patent No.: US 10,547,239 B2
(45) Date of Patent: Jan. 28, 2020

(54) VOLTAGE CONVERTER CONTROL APPARATUS CONFIGURED TO DETERMINE A NORMAL DUTY RATIO RANGE BASED ON A COMMAND VALUE FOR THE OUTPUT VOLTAGE

(71) Applicant: DENSO CORPORATION, Kariya, Aichi-pref. (JP)

(72) Inventors: Yuichi Katsuki, Toyota (JP); Takeshi Itoh, Nagoya (JP)

(73) Assignee: DENSO CORPORATION, Kariya (JP)

(*) Notice: Subject to any disclaimer, the term of this patent is extended or adjusted under 35 U.S.C. 154(b) by 266 days.

(21) Appl. No.: 14/839,261

(22) Filed: Aug. 28, 2015

(65) Prior Publication Data

US 2016/0065073 A1    Mar. 3, 2016

(30) Foreign Application Priority Data

Aug. 28, 2014  (JP) .................................. 2014-174139
Mar. 2, 2015   (JP) .................................. 2015-040196

(51) Int. Cl.
*H02M 7/48* (2007.01)
*H02M 1/32* (2007.01)
*H02M 3/158* (2006.01)
*B60L 3/12* (2006.01)

(52) U.S. Cl.
CPC ............. *H02M 3/158* (2013.01); *H02M 7/48* (2013.01); *B60L 3/12* (2013.01); *B60L 2210/40* (2013.01); *H02M 1/32* (2013.01)

(58) Field of Classification Search
CPC .......... H02M 7/42; H02M 7/44; H02M 7/538; H02M 7/53803; H02M 7/5387; H02M 7/53871; H02M 7/66; H02M 7/68; H02M 7/757; H02M 3/156; H02M 3/157; H02M 3/158; H02M 3/1582; H02M 1/32; H02M 2001/325; H02M 2001/0054; H02M 2001/0003; H02M 7/48; Y02B 70/1441; B60L 15/007; B60L 3/12; B60L 3/003;
(Continued)

(56) References Cited

U.S. PATENT DOCUMENTS 5,375,429 A * 12/1994 Tokizaki ............... F24F 1/0003
                                                    323/906
2003/0117823 A1   6/2003 Sato
2004/0228150 A1  11/2004 Sato
(Continued)

FOREIGN PATENT DOCUMENTS

JP    2003-189599 A    7/2003
JP    2009-148116 A    7/2009

*Primary Examiner* — Yusef A Ahmed
*Assistant Examiner* — Shahzeb K Ahmad
(74) *Attorney, Agent, or Firm* — Oliff PLC

(57) ABSTRACT

A voltage converter control apparatus controls repetitive switching operations of a voltage converter, for conversion between a terminal voltage of a battery as an input-side voltage and a terminal voltage of a power inverter as an output-side voltage, by determining a command value of duty ratio of the switching in accordance with a command value of the output-side voltage. The voltage converter control apparatus sets a normal duty ratio range defining limit values of the duty ratio for normal operation of the voltage converter, with the limit values being determined based upon information including the command value of the output-side voltage.

6 Claims, 12 Drawing Sheets

(58) Field of Classification Search
CPC ......... B60L 2240/527; B60L 2240/526; B60L 2210/40; B60L 2210/30
See application file for complete search history.

(56) References Cited

U.S. PATENT DOCUMENTS

| | | |
|---|---|---|
| 2005/0067999 A1 | 3/2005 | Okamura et al. |
| 2007/0029954 A1 | 2/2007 | Okamura et al. |
| 2007/0195568 A1 | 8/2007 | Sato |
| 2011/0019315 A1* | 1/2011 | Jenkner ................ H02M 3/157 361/18 |
| 2012/0139460 A1* | 6/2012 | Senkou ............... H02P 21/0096 318/400.02 |
| 2013/0135775 A1* | 5/2013 | Yao ........................ H02H 9/025 361/18 |
| 2013/0141953 A1* | 6/2013 | Nakamura ............ B60L 3/0038 363/74 |
| 2013/0200696 A1* | 8/2013 | Yamada ................ B60L 11/123 307/10.1 |
| 2014/0362605 A1* | 12/2014 | Jang .................... H02M 3/3353 363/17 |

* cited by examiner

VOLTAGE CONVERTER CONTROL APPARATUS CONFIGURED TO DETERMINE A NORMAL DUTY RATIO RANGE BASED ON A COMMAND VALUE FOR THE OUTPUT VOLTAGE

CROSS-REFERENCE TO RELATED APPLICATIONS

This application is based on and incorporates herein by reference Japanese Patent First Application No. 2014-174139 filed on Aug. 28, 2014 and Japanese Patent First Application No. 2015-40196 filed on Mar. 2, 2015.

BACKGROUND OF THE INVENTION

Field of Application

The present invention relates to a control apparatus for a voltage converter.

Various types of control apparatus are known for controlling a voltage converter which is connected between a DC power source and a load circuit and executes voltage conversion by switching operation of low potential-side and high potential-side switching elements. In particular the invention is directed to a voltage converter control apparatus capable of detecting abnormal operation of the voltage converter, due to failure of a switching element or a voltage sensor, etc.

For example as described in Japanese Patent Publication No. 2009-148116 (referred to in the following as reference document 1), with a voltage converter which executes voltage conversion by repetitive switching operations, a logical detection range is calculated for the values of detected output voltage VH of the voltage converter. The logical detection range is calculated based on an error range of a duty ratio of the switching (where the error is caused by a dead time and a switching delay of a drive circuit of the voltage converter) and on detection error ranges of an input voltage VL and of the output voltage VH. It is judged that the voltage converter is functioning abnormally if the detected output voltage value VH remains continuously outside the logical detection range, e.g., for longer than a predetermined duration.

However with the technology of reference document 1, since the logical detection range is obtained by utilizing the error ranges of voltage sensors, and there may be large variations between the detection characteristics of respective voltage sensors, the logical detection range may become excessively wide, since such factors must be taken into account when setting the logical detection range. Thus it may not be possible to reliably detect abnormality of the voltage converter.

SUMMARY OF THE INVENTION

Hence it is desired to overcome the above problem, by providing a voltage converter control apparatus whereby abnormal operation of a voltage converter can be detected with the accuracy of the detection being unaffected by variations in the characteristics of voltage sensors that are utilized to detect input and output voltages of the voltage converter.

The voltage converter control apparatus is applied to a voltage converter that is connected between a battery and power inverter (DC/AC power inverter), for controlling the voltage converter to convert between an input-side voltage (the terminal voltage of the battery) and an output-side voltage (the terminal voltage of the power inverter). In particular the voltage converter control apparatus is applicable to a voltage converter having an inductor connected between the battery and a voltage step-up section, the voltage step-up section being based on switching elements which perform on/off switching for alternately storing and discharging electrical energy by the inductor.

The voltage converter control apparatus basically consists of a voltage step-up control section for controlling the voltage converter and an abnormality detection section for detecting abnormal operation of the voltage converter. The voltage step-up control section calculates the duty ratio of the switching to be executed by the switching elements, based on currently detected values of the input-side voltage and output-side voltage and on a command value of the output-side voltage. The abnormality detection section determines a range of duty ratio values, referred to as the normal duty ratio range, based on information including information indicative of the output-side voltage value. The abnormality detection section detects abnormal operation of the voltage converter when successively calculated duty ratio values remain continuously outside the normal duty ratio range, e.g., for more than predetermined number of calculation cycles.

The invention is characterized in that an output voltage command value (target value of the output-side voltage) is used as the information indicative of the output-side voltage, when determining the normal duty ratio range, instead of using detected values of the output-side voltage. In that way it can be ensured that the normal duty ratio range will not be affected by any detection errors of an output voltage sensor, so that abnormality of the voltage converter can be reliably detected.

A first implementation of the invention is applicable to a voltage converter that can be operated either in a drive mode (in which power discharged from the battery is supplied to the load circuit) or a regeneration mode (in which power generated by the load circuit is supplied to charge the battery). According to the first implementation, the abnormality detection section acquires, in addition to the output voltage command value (Vsys*), values of maximum allowable charging power (Win), maximum allowable discharge power (Wout), EMF (electromotive force) ($V_B$) and internal resistance $R_B$ respectively of the battery, and calculates the relationship between values of the duty ratio (Dh) and battery power ($P_B$) by applying the following equation, with values of discharge power being assigned a positive polarity and of discharge power being assigned a negative polarity:

$$P_B = -\left(\frac{Vsys^{*2}}{R_B}\right) \times \left(Dh - \frac{V_B}{2Vsys^*}\right)^2 + \frac{V_B^2}{4R_B}$$

The above equation expresses a parabolic form of characteristic, with values of battery power extending along the axis of the parabola. The normal duty ratio range Dnr is determined as a range that is higher than the duty ratio value corresponding to the parabola axis, and corresponds to battery power values which are between the maximum allowable charging power (Win) and maximum allowable discharge power (Wout) values.

According to a second implementation of the invention, the abnormality detection section acquires (in addition to the output voltage command value) detected values of the input-side voltage of the voltage converter. In addition, the abnormality detection section includes a non-volatile memory in which a plurality of characteristic maps are stored beforehand, corresponding to respectively different output voltage command values. Each characteristic map expresses a relationship that exists between values of the input-side voltage and duty ratio when the corresponding output voltage command value is applied. The abnormality detection section selects the characteristic map corresponding to the output voltage command value that is currently specified, and determines the normal duty ratio range Dnr by applying the currently detected value of the input-side voltage to the selected characteristic map.

The abnormality detection section may be further configured to acquire the values of allowable battery charging power and allowable battery discharge power of the battery. In that case, each of the characteristic maps expresses a relationship between values of the input-side voltage, duty ratio, and battery power, and the normal duty ratio range is determined by applying the input-side voltage value and the values of allowable battery charging power and allowable battery discharge power to the selected characteristic map.

The second implementation has the advantage that it is not necessary to acquire the values of internal resistance and EMF of the battery, which may be difficult to obtain. The input-side voltage value can be readily acquired however, since it is required for use in controlling the voltage converter.

According to a third implementation of the invention, the abnormality detection section has a memory (non-volatile memory) in which are stored beforehand a plurality of characteristic maps corresponding to respective output voltage command values, each expresses a relationship between values of the input-side voltage, duty ratio, and battery power when the corresponding output voltage command value is applied. The abnormality detection section also acquires (In addition to the output voltage command value Vsys*) the values of EMF ($V_B$) and internal resistance ($R_B$) of the battery, and the minimum possible value (Vin_min) and maximum possible value (Vin_max) of the input-side voltage of the voltage converter.

In that case, the abnormality detection section first estimates an attainable input voltage range, based on the acquired information. The range is defined by the maximum and minimum values that can be attained by the input-side voltage (Vin) of the voltage converter at the currently existing value of battery power (i.e., discharge power or charging power). The estimation is based on a relationship between values of battery power ($P_B$) and the input-side voltage (Vin) that is expressed by the following equation:

$$P_B = -\left(\frac{1}{R_B}\right) \times \left(Vin - \frac{V_B}{2}\right)^2 + \frac{V_B^2}{4R_B}$$

The abnormality detection section then generates a characteristic map corresponding to the output voltage command value, and applies the attainable input voltage range to the selected characteristic map, to obtain the normal duty ratio range Dnr.

This implementation has the advantage that a normal duty ratio range can be determined without requiring the values of allowable battery charging power Win and allowable battery discharge power Wout of the battery, which may be difficult to acquire. In addition, since the value of input-side voltage is not required, any detection errors of an input voltage sensor do not have an adverse effect on abnormality detection.

DESCRIPTION OF PREFERRED EMBODIMENTS

Figure 1:
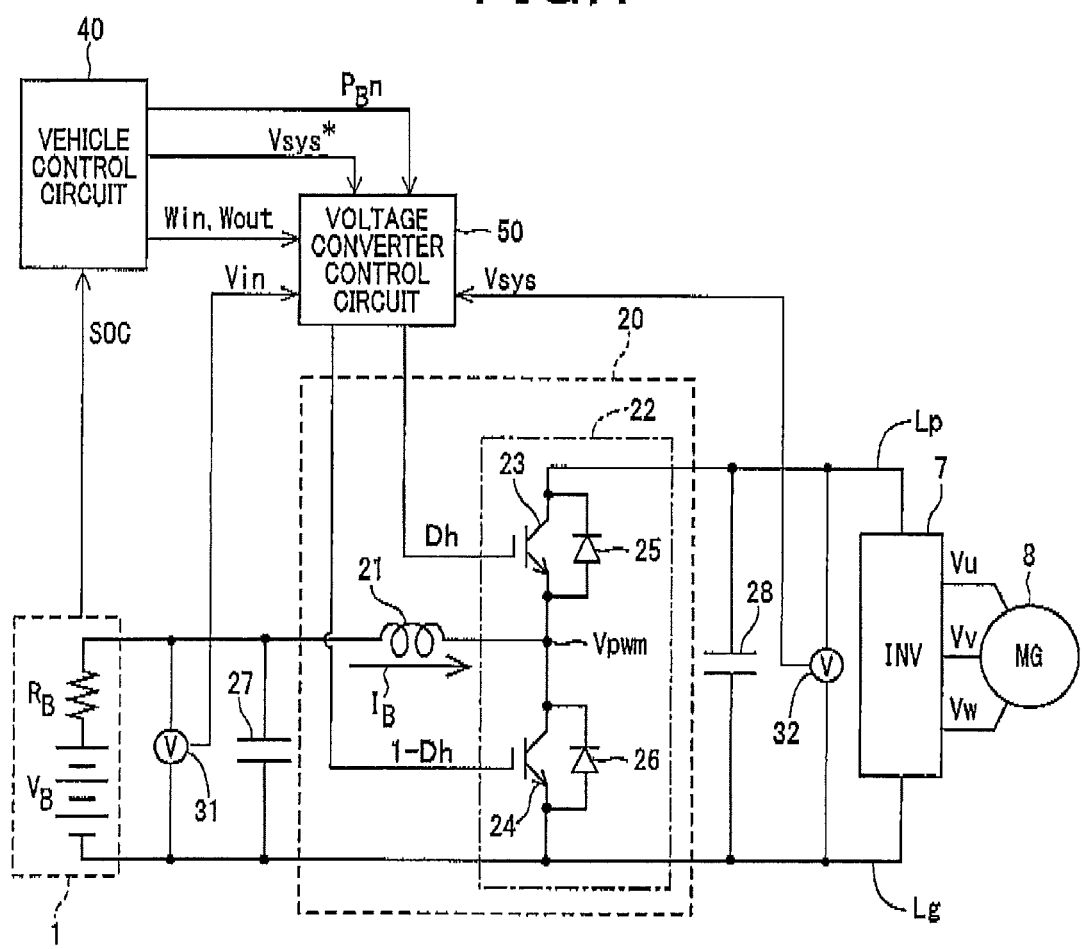
FIG. 1 is a conceptual circuit diagram of a system incorporating a voltage converter control apparatus according to the present invention.

Embodiments of a voltage converter control apparatus are described in the following referring to the drawings. Firstly, the overall configuration is described of a system which is common to each of the embodiments. Each embodiment controls a voltage converter which supplies/receives electrical power to/from a motor-generator. The motor-generator is the motive power source of a hybrid vehicle or an electric vehicle.

Overall Configuration of Voltage Converter

In FIG. 1, the voltage converter 20 is connected between a battery 1 and an power inverter (power inverter) 7. The power inverter 7 is the load circuit of the voltage converter 20, and drives a motor-generator 8 during a drive mode of operation (i.e., when power is supplied from the battery 1) and receives power from the motor-generator 8 during operation in a regeneration mode. The terminal voltage of the battery 1, as detected by an input voltage sensor 31, is referred to in the following as the input-side voltage Vin. The terminal voltage of the power inverter 7, as detected by an output voltage sensor 32, is referred to in the following as the output-side voltage Vsys. Vsys is higher than Vin, i.e., the voltage converter 20 is a voltage step-up converter.

The system configuration external to the voltage converter 20 is as follows. The battery 1 is of rechargeable type, such as a nickel-mercury or lithium-ion of battery, etc. Alternatively, the battery 1 could be an electrical double-layer capacitor type of energy storage device.

As shown in FIG. 1, the internal circuit of the battery 1 can be represented as an internal resistance $R_B$ and an EMF (electromotive force) $V_B$, i.e., the terminal voltage of the battery 1 when the voltage drop across the internal resistance $R_B$ is zero.

The power inverter 7 incorporates six switching elements connected in a bridge configuration, to which a system voltage Vsys produced by the voltage converter 20 (i.e., the output-side voltage of the voltage converter 20) is applied. On-off switching operation of the switching elements of respective phases is controlled (by phase control and PWM control) for converting the DC power supplied from the voltage converter 20 to 3-phase AC power, which is supplied to the motor-generator 8.

The motor-generator 8 may be for example a permanent magnet type of 3-phase synchronous AC motor, used as a motor-generator in a hybrid vehicle or electric vehicle. The motor-generator 8 is operated as a motor which drives the vehicle by generating torque that is transmitted to road wheels of the vehicle via a transmission, etc., and is operated as an electrical generator which is driven by torque transmitted from an internal combustion engine of the vehicle (in the case of a hybrid vehicle) or transmitted from the road wheels of the vehicle.

The vehicle control circuit 40 derives a torque command value expressing a value of torque required to be produced by the motor-generator 8, with the torque command value being generated based upon signals including an accelerator signal, brake signal, shift signal, vehicle speed signal, etc., from respective sensors (not shown in the drawings). In addition the vehicle control circuit 40 calculates an output voltage command value Vsys*, which is a target value of the output-side voltage Vsys of the voltage converter 20, and supplies that command value to the voltage converter control apparatus 50. The output voltage command value Vsys* is calculated based upon the torque command value of the motor-generator 8 and upon the rotation speed of the motor-generator 8, etc.

In addition, the vehicle control circuit 40 acquires the SOC (state of charge) value of the battery 1 and calculates respective values of allowable battery charging power Win and allowable battery discharge power Wout, which define an allowable range of values of charge/discharge power of battery 1. Although not specifically indicated in FIG. 1, the 40× also acquires the values of voltage Vin and current $I_B$ of the battery, for use in measuring the level of battery power (charge or discharge power), etc.

With the described embodiments, the voltage converter control apparatus 50 calculates a duty ratio command value expressing the required value of on/off times in each switching period of a pair of switching elements in a voltage step-up section 22 of the voltage converter 20 (described in the following). The duty ratio command value is calculated based on the input-side voltage Vin, the output-side voltage Vsys, and the output voltage command value Vsys*, etc.

It should be noted that the invention could be equally applied to a system in which the output voltage command value is calculated by the voltage converter control apparatus 50, instead of being supplied from the vehicle control circuit 40.

The configuration of the voltage converter 20 is as follows. As shown in FIG. 1, this includes an inductor 21, and the voltage step-up section 22 which functions as a voltage conversion section. The inductor 21 stores and discharges electrical energy at an induced voltage produced by variations in current ($I_B$).

The voltage step-up section 22 includes two switching elements 23 and 24 connected in series, and diodes 25 and 26 respectively connected in parallel with the switching elements 23, 24. The high potential-side switching element 23 is connected between the output terminal of the inductor 21 and a high-potential supply lead Lp of the power inverter 7, while the low potential-side switching element 24 is connected between the output terminal of the inductor 21 and a low-potential supply lead Lg of the power inverter 7. The diodes 25 and 26 are respective reverse-flow diodes, each connected in a direction for enabling current to flow from the low potential side to the high potential side of the circuit.

The switching elements 23 and 24 execute complementary on/off switching in accordance with the command value of duty ratio that is specified by the voltage converter control apparatus 50.

As used herein, the term "duty ratio Dh" is to be understood as signifying the ratio of the "on" (i.e., conduction) part of each switching period of the high potential-side switching element 23 to the duration of the switching period. The duty ratio Dh is expressed as a value within the range 0 to 1, and not as a percentage.

If dead time is ignored, the "on" duty ratio of the low potential-side switching element 24 is obtained as (1−Dh).

In the following, operation of the voltage converter 20 when the motor-generator 8 is being electrically driven (supplied with electrical power, to produce torque for motive power) is referred to as "drive operation", while operation when the motor-generator 8 is being mechanically driven and generating electrical power is referred to as "regeneration operation".

During drive operation, when the high potential-side switching element 23 is in the off (non-conducting) state and the low potential-side switching element 24 in the on (conducting) state, energy becomes stored in the inductor 21 by current which flows from the battery 1 via the inductor 21. When the high potential-side switching element 23 is in the on state and the low potential-side switching element 24 in the off state, the stored energy is discharged from the inductor 21, whereby the output-side voltage Vsys applied to the power inverter 7 becomes the input-side voltage Vin incremented by an induced voltage of the inductor 21.

During regeneration operation, when the high potential-side switching element 23 is in the on state and the low potential-side switching element 24 in the off state, current is passed from the power inverter 7 into the battery 1. When the high potential-side switching element 23 is in the off state and the low potential-side switching element 24 in the on state, this regeneration of power from the power inverter 7 is halted.

During both drive operation and regeneration operation, the output-side voltage of the voltage converter 20 is controlled to a required value that is determined by the value of the duty ratio Dh, calculated by the voltage converter control apparatus 50.

Also as shown in FIG. 1, a filter capacitor 27 is connected at the input side of the voltage converter 20, for removing electrical noise from the output voltage of the battery 1. A smoothing capacitor 28 is also connected at the output side of the voltage converter 20, for smoothing the output-side voltage Vsys from the power inverter 7, and an output voltage sensor 32 is provided for detecting the output-side voltage Vsys.

The detected values of the input-side voltage Vin, obtained by the input voltage sensor 31 and of the output-side voltage Vsys, obtained by the smoothing capacitor 28, are inputted to the voltage converter control apparatus 50.

Configuration of Voltage Converter Control Apparatus

The configuration of the voltage converter control apparatus 50 will be described referring to FIG. 2. The voltage converter control apparatus 50 is based on a computer such as a microcomputer, having a CPU, ROM, I/O section, etc. (not shown in the drawings). The functions described in the following for controlling the voltage converter 20 and detecting abnormal operation are executed by processing performed by the CPU in accordance with a program that has been stored beforehand (i.e., software processing) and also by operation of dedicated hardware circuitry.

Figure 2:
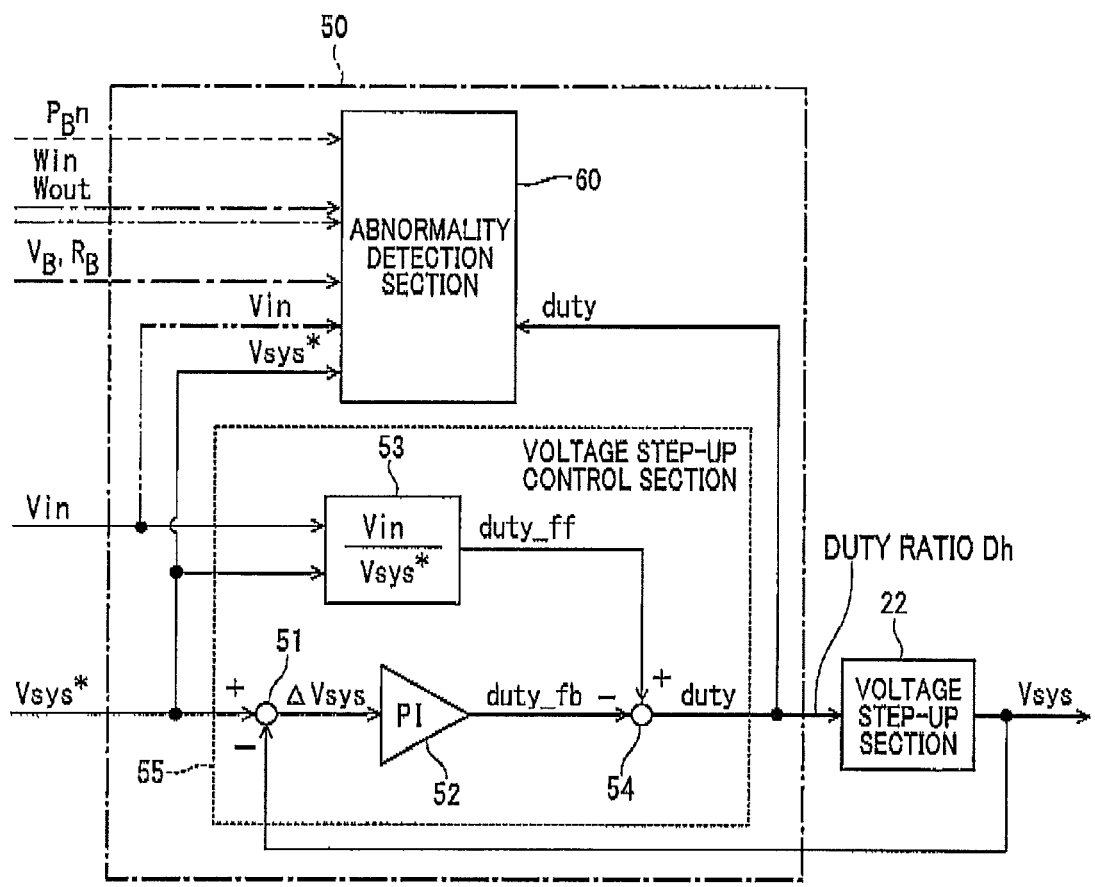
FIG. 2 is a control block diagram of the voltage converter control apparatus.

As shown in FIG. 2, in which basic functions executed by the voltage converter control apparatus 50 are conceptually illustrated by respective blocks, the voltage converter control apparatus 50 essentially consist of a voltage step-up control section 55 which controls the voltage converter 20, and an abnormality detection section 60 which detects abnormal operation of the voltage converter 20.

The voltage step-up control section 55 is made up of a feedback subtractor 51, a PI (proportional-integral) controller 52, a feed-forward calculation section 53 and a duty ratio subtractor 54. The feedback subtractor 51 calculates a deviation ΔVsys between the output voltage command value Vsys* and the output-side voltage Vsys. The PI controller 52 uses proportional integration to calculate values of a feedback term duty_fb such as to make the deviation ΔVsys converge towards zero.

The feed-forward calculation section 53 calculates a feed-forward term duty_ff based on the ratio of the input-side voltage Vin to the output voltage command value Vsys*.

The duty ratio subtractor 54 subtracts the feedback term duty_fb from the feed-forward term duty_ff, and outputs the result to the voltage step-up section 22 as the value of the duty ratio Dh.

There is a possibility of failure of one or more of the switching elements 23 or 24 or of the reverse-current diodes 25, 26 in the voltage converter 20, or of the voltage sensors 31, 32. In the event of such a failure, control executed by the voltage step-up control section 55 may become unstable or impossible.

Hence the abnormality detection section 60 of the voltage converter control apparatus 50 sets a range of values of the duty ratio Dh, referred to in the following as the normal duty ratio range Dnr. This is a range of values within which the duty ratio Dh should remain so long as the voltage converter 20 is functioning normally. The normal duty ratio range Dnr is set based upon information relating to the input-side voltage of the voltage converter 20, and information that is indicative of the output-side voltage of the voltage converter 20, as described in the following. If successively calculated values of the duty ratio Dh remain continuously outside the normal duty ratio range Dnr for more than a predetermined number of calculation cycles, it is judged that there the voltage converter 20 is functioning abnormally.

In the case of abnormality detection executed for example as described in reference document 1, a logical detection range of an output voltage sensor value VH (corresponding to the output-side voltage Vsys of the present invention) is calculated, based on error ranges of an input voltage sensor value VL and of the output voltage sensor value VH, and based on an error range of switching duty ratio values, where the error is caused by a dead time and a switching delay of a drive circuit of the voltage converter. If the value of the switching duty ratio remains continuously outside the logical detection range for longer than a predetermined duration, that condition is detected as abnormality of the voltage converter.

However with such prior art technology, since the logical detection range is calculated by utilizing the error ranges of voltage sensors, and since there may be large variations between the characteristics of respective voltage sensors, it may be necessary to set the logical detection range to be excessively wide. Hence it may not be possible to reliably detect abnormal operation of the voltage converter.

However in the case of the abnormality detection section 60 of the present invention, instead of using detected values of the output-side voltage of the voltage converter 20 as a basis for determining the normal duty ratio range Dnr, the output voltage command value Vsys* is used. Hence it is not necessary to widen the normal duty ratio range to take account of a possible range of detection error of the output voltage sensor 32, or variations between the detection characteristics of respective sensors.

In the following, the basic manner of setting the normal duty ratio range Dnr by first, second and third embodiments will be described, with the description based on the types of information used by the abnormality detection section 60 for setting that range. Firstly, for each of the embodiments, the abnormality detection section 60 must acquire the output voltage command value Vsys*, and also the currently calculated value of the duty ratio Dh (for comparison with the normal duty ratio range Dnr). These items are indicated by the full-line arrows in FIG. 2. The abnormality detection section 60 of the first embodiment must also acquire the values of internal resistance ($R_B$), EMF ($V_B$), charge capacity (Win) and discharge capacity (Wout) of the battery 1. The abnormality detection section 60 of the second embodiment must also acquire the input-side voltage (Vin) of the voltage converter 20, together with the battery charge capacity (Win) and battery discharge capacity (Wout). The abnormality detection section 60 of the third embodiment must also acquire the lowest and highest attainable values of the input voltage (Vin) of the voltage converter 20, and the value of power ($P_B$n) that is currently being supplied to or from the battery 1.

First Embodiment

Setting of the normal duty ratio range Dnr with the first embodiment will be described referring to FIGS. 3 to 5.

Referring to the circuit of the voltage converter 20 in FIG. 1, the battery 1 is shown in simple equivalent circuit form, as a series-connected combination of an EMF $V_B$ and an internal resistance $R_B$, through which flows a battery current $I_B$. Using the battery current $I_B$ as a parameter, the battery power $P_B$ can be expressed by equation (1) below:

$$P_B = (V_B - R_B \times I_B) \times I_B \qquad (1)$$

By developing equation (1) as follows, a second-order equation (2) for $I_B$ can be obtained:

$$P_B = (V_B - R_B \times I_B) \times I_B \quad (2)$$

$$= -R_B \times \left(I_B^2 - \frac{I_B \times V_B}{R_B}\right)$$

$$= -R_B \times \left(I_B - \frac{V_B}{2R_B}\right)^2 + \frac{V_B^2}{4R_B}$$

Figure 3A:
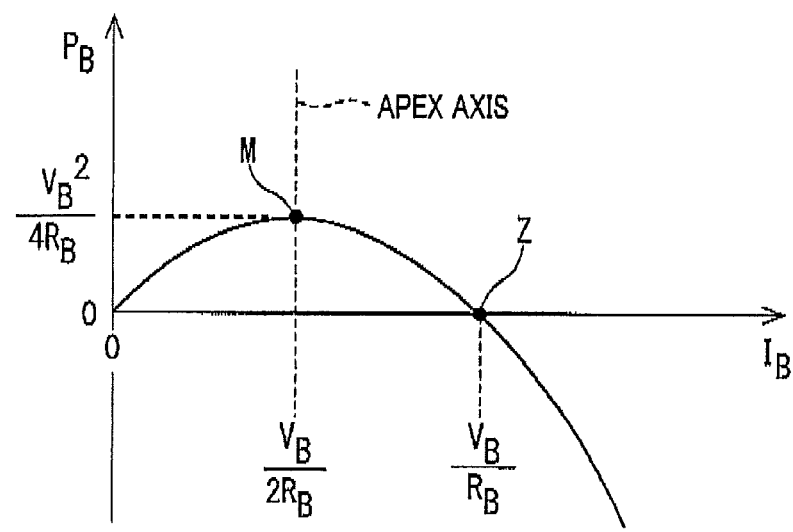
FIGS. 3A and 3B are diagrams for use in describing the derivation of an equation based on a circuit model of a voltage converter, with a first embodiment.

When equation (2) is plotted graphically with values of $I_B$ along the horizontal axis and $P_B$ along the vertical axis, a parabolic characteristic is obtained, with the axis of the parabola extending vertically, as shown in FIG. 3A. The value of current $I_B$ corresponding to the axis of the parabola is expressed by equation (3.1) below, and the coordinates of the apex M of the parabola are expressed by equation (3.2) below.

$$I_B = \frac{V_B}{2R_B} \quad (3.1)$$

$$M\left(\frac{V_B}{2R_B}, \frac{V_B^2}{4R_B}\right) \quad (3.2)$$

For values of battery current $I_B$ which exceed the value corresponding to the axis of the parabola, the coordinates of a zero crossing point Z are expressed by equation (4) below.

$$Z\left(\frac{V_B}{R_B}, 0\right) \quad (4)$$

An equation which expresses values of battery power $P_B$ with duty ratio Dh as a parameter is derived as follows. Firstly, designating Vo as the average value of the voltage at the junction between the high potential-side switching element 23 and the low potential-side switching element 24 (referred to in the following as the median voltage Vpwm), the battery current $I_B$ can be expressed using Vo by equation (5) below.

$$I_B = \frac{V_B - V_O}{R_B} \quad (5)$$

By inserting equation (5) into equation (1), the following equation (6) is obtained.

$$P_B = (V_B - R_B \times I_B) \times I_B \quad (6)$$

$$= (V_B - (V_B - V_O)) \times \frac{V_B - V_O}{R_B}$$

$$= -\left(\frac{1}{R_B}\right) \times (V_O^2 - V_B \times V_O)$$

$$= -\left(\frac{1}{R_B}\right) \times \left(V_O - \frac{V_B}{2}\right)^2 + \frac{V_B^2}{4R_B}$$

Figure 3B:
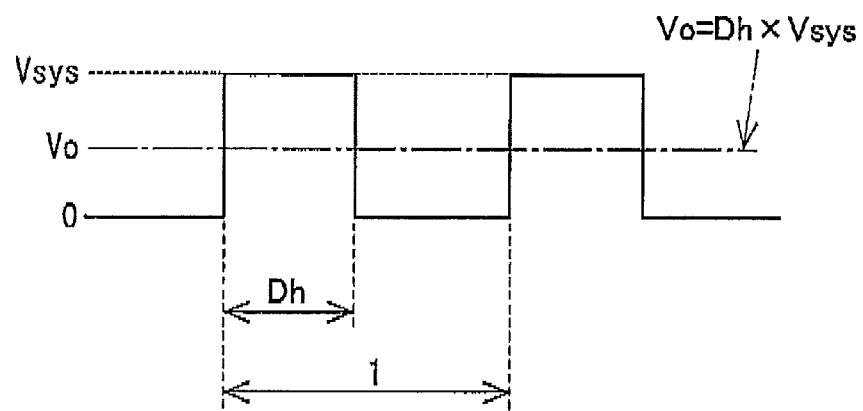

Furthermore as shown by FIG. 3B, the average value Vo of the median voltage Vpwm can be expressed using the duty ratio Dh and the output-side voltage Vsys as {Vo=Dh×Vsys}. By inserting this into equation (6), the following equation (7) is obtained.

$$P_B = -\left(\frac{Vsys^2}{R_B}\right) \times \left(Dh - \frac{V_B}{2Vsys}\right)^2 + \frac{V_B^2}{4R_B} \quad (7)$$

Figure 4A:
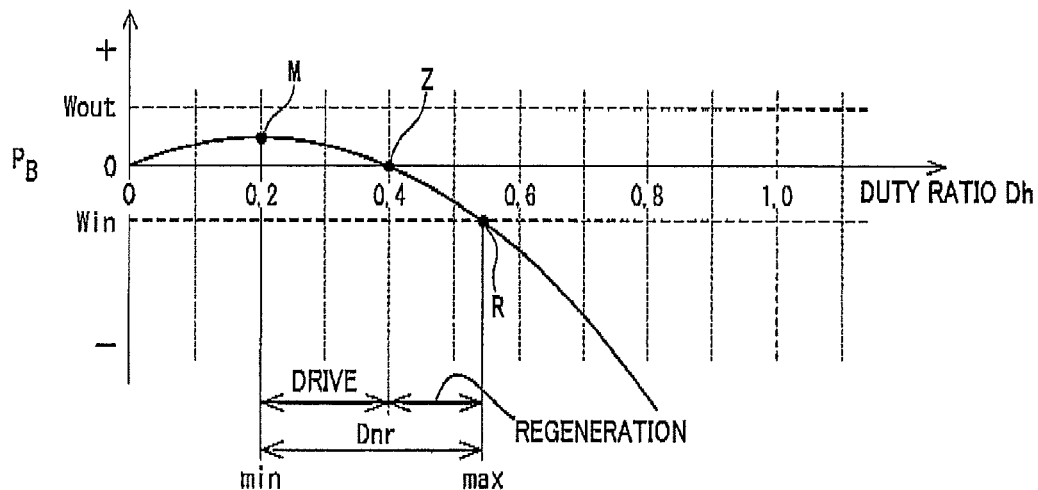
FIGS. 4A, 4B and 4C are diagrams for use in describing a normal duty ratio range and an input-side voltage/battery power relationship characteristic, with the first embodiment.
Figure 4B:
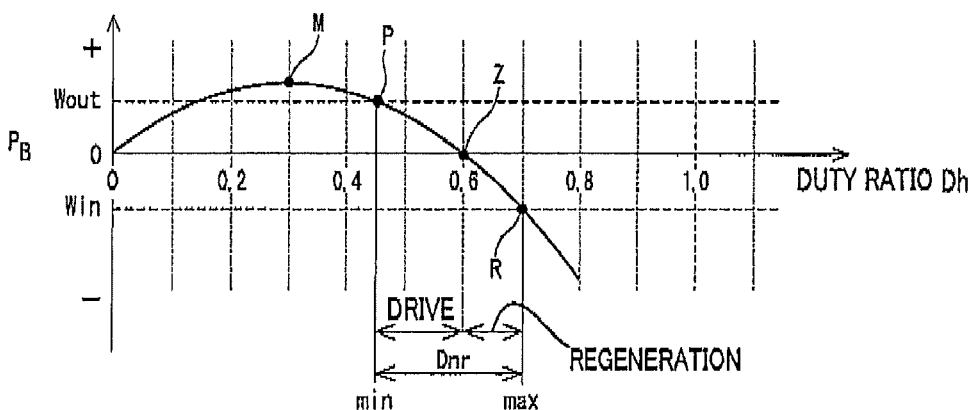
Figure 4C:
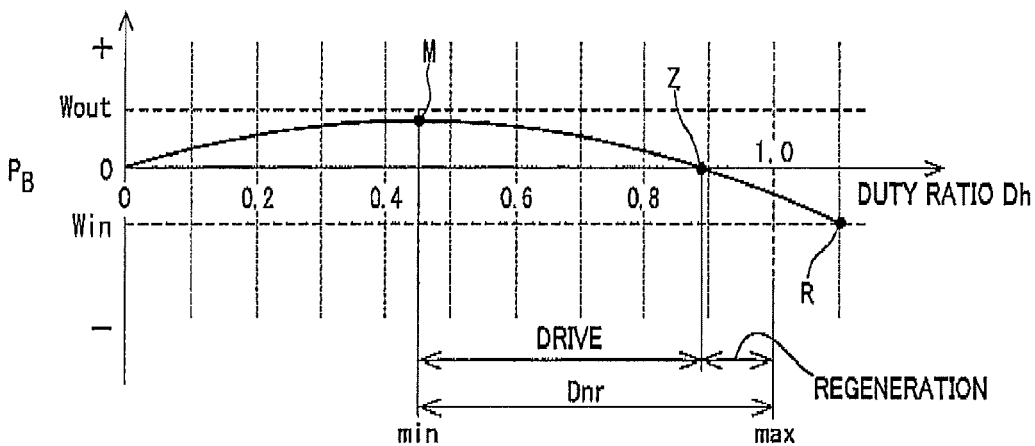

As shown in FIGS. 4A, 4B and 4C, when equation (7) is plotted graphically with values of duty ratio Dh along the horizontal axis and battery power $P_B$ along the vertical axis, a parabolic characteristic is obtained, with the parabola axis extending vertically. With this embodiment, instead of using the output-side voltage Vsys detected by the output voltage sensor 32, the output voltage command value Vsys* is utilized as output-side voltage information. Hence equation (7) can be rewritten as the following equation (8) by using Vsys* in place of Vsys.

$$P_B = -\left(\frac{Vsys^{*2}}{R_B}\right) \times \left(Dh - \frac{V_B}{2Vsys^*}\right)^2 + \frac{V_B^2}{4R_B} \quad (8)$$

The value of duty ratio Dh corresponding to the axis of the parabola expressed by equation (8) is obtained from equation (9.1) below, while the coordinates of the apex of the parabola are obtained from equation (9.2) below.

$$Dh = \frac{V_B}{2Vsys^*} \quad (9.1)$$

$$M\left(\frac{V_B}{2Vsys^*}, \frac{V_B^2}{4R_B}\right) \quad (9.2)$$

Next, referring to FIGS. 4A to 4C, the manner of setting the lowest value "min" and highest value "max" of the normal duty ratio range Dnr based on the battery power characteristic will be described. FIGS. 4A to 4C show examples of respectively different relationship patterns between the battery power $P_B$ and the duty ratio Dh (i.e., resulting from respectively different combinations of values of Vsys*, $R_B$ and $V_B$) as obtained using equation (8).

In each of FIGS. 4A to 4C, the normal duty ratio range Dnr is defined between a lowest value "min" and a highest value "max". The point expressing the duty ratio value at which the battery power $P_B$ is zero (for duty ratio values higher than that at the axis of the parabola) is designated as the zero crossing point Z. Also in each of FIGS. 4A to 4C, the point of intersection between the Win axis and the rightward part of the parabola is designated as the "regeneration-operation boundary point R". In FIG. 4B, the point of intersection between the Wout axis and the rightward part of the parabola is designated as the "drive-operation boundary point P".

With the pattern of FIG. 4A, the value of battery power $P_B$ at the apex M of the parabola is less than the allowable battery discharge power Wout, and the value of duty ratio Dh corresponding to the regeneration-operation boundary point R is less than 1.

In that case, the lowest value "min" of the normal duty ratio range Dnr is the value of duty ratio Dh corresponding to the apex M (i.e., corresponding to the axis of the parabola), while the highest value "max" of the range Dnr is the value of duty ratio Dh corresponding to the regeneration-operation boundary point R.

In FIG. 4A, a first region of the normal duty ratio range Dnr, in which the values of duty ratio Dh do not exceed the value at the zero crossing point Z, corresponds to drive operation. A second region of the range Dnr, whose values exceed the zero crossing point Z, corresponds to regeneration operation.

With the pattern of FIG. 4B, the value of battery power $P_B$ at the apex M of the parabola is greater than the allowable battery discharge power Wout. As in the example of FIG. 4A, the value of duty ratio Dh corresponding to the regeneration-operation boundary point R is less than 1. The value of duty ratio Dh corresponding to the drive-operation boundary point P is located between those of the apex M and of the regeneration-operation boundary point R, respectively.

In this case, the lowest value "mln" of the normal duty ratio range Dnr is the duty ratio value of the drive-operation boundary point P, while the highest value "max" is the duty ratio value of the regeneration-operation boundary point R.

With the pattern of FIG. 4C, the value of battery power ($P_B$) at the apex M of the parabola is less than the allowable battery discharge power Wout, as with the pattern of FIG. 4A, and the value of duty ratio Dh corresponding to the regeneration-operation boundary point R is greater than the maximum value (1.0).

In this case, the lowest value "min" of the normal duty ratio range Dnr is that of the apex M, while the highest value "max" logically becomes 1.0. It will be understood that, instead of setting of the limit values "min" and "max" by generating and applying a parabola characteristic map as described above, it would be equally possible to determine these limit values by direct calculation, i.e., obtaining the duty ratio Dh values of the points M and R (and point P, if applicable) by using equation (9.2) and by applying the acquired values of Wout, Win in equation (8).

The overall sequence of abnormality detection processing executed by the abnormality detection section 60 of the first embodiment will be described referring to the flow diagram of FIG. 5. In FIG. 5, steps S1-2A and S2A are specific to the first embodiment. Each of the remaining steps are common to the first and second embodiments. The processing routine of FIG. 5 is executed repetitively, for example at each of successive control periods.

In steps S1-1, S1-2A and S1-3, the abnormality detection section 60 acquires various information items that are used in the abnormality detection processing. The sequence of executing these steps is not limited to any specific order.

In step S1-1, the output voltage command value Vsys* is acquired. In step S1-2A, the values of the battery EMF ($V_B$) and battery internal resistance ($R_B$) are acquired. (It would alternatively be possible to use values of the battery EMF and battery internal resistance which have been stored beforehand, i.e., predetermined fixed values).

In step S1-3, the values of the allowable battery charging power Win and allowable battery discharge power Wout are acquired from the vehicle control circuit 40.

In step S2A, data expressing a parabola characteristic are generated using equation (8), based on the acquired information. In step S3, the values of lowest value "min" and highest value "max" of the normal duty ratio range Dnr are set by referring to the parabola map, as described for the examples of FIGS. 4A to 4C.

However as described above, instead of generating and utilizing a parabola characteristic map, it is possible to obtain the limit values of the normal duty ratio range Dnr by direct calculation, using equations (8) and (9.2) and the acquired values of Wout and Win.

In step S4, the abnormality detection section 60 acquires the value of duty ratio Dh that is currently calculated by the voltage step-up control section 55. If that value is within the normal duty ratio range Dnr (YES decision), it is judged that the voltage converter 20 is operating normally (step S6), and an abnormality counter is then cleared (step S7). This execution of the processing routine is then ended.

If the value of duty ratio Dh is outside the normal duty ratio range Dnr, the abnormality counter is incremented (step S8). The count value attained by the abnormality counter is then evaluated (step S9). If the count exceeds a predetermined value (YES decision in step S9), it is judged that there is an abnormality of the voltage converter 20 (step S10), and this execution of the processing routine is then ended.

In that way, a decision is made that there is abnormality of the voltage converter 20 only if the count reached by the abnormality counter attains a predetermined value, indicating that the duty ratio Dh has remained continuously outside the normal duty ratio range Dnr for more than a predetermined number of processing cycles. This serves to prevent judgement errors caused by effects of electrical noise or by momentary processing errors.

Figure 5:
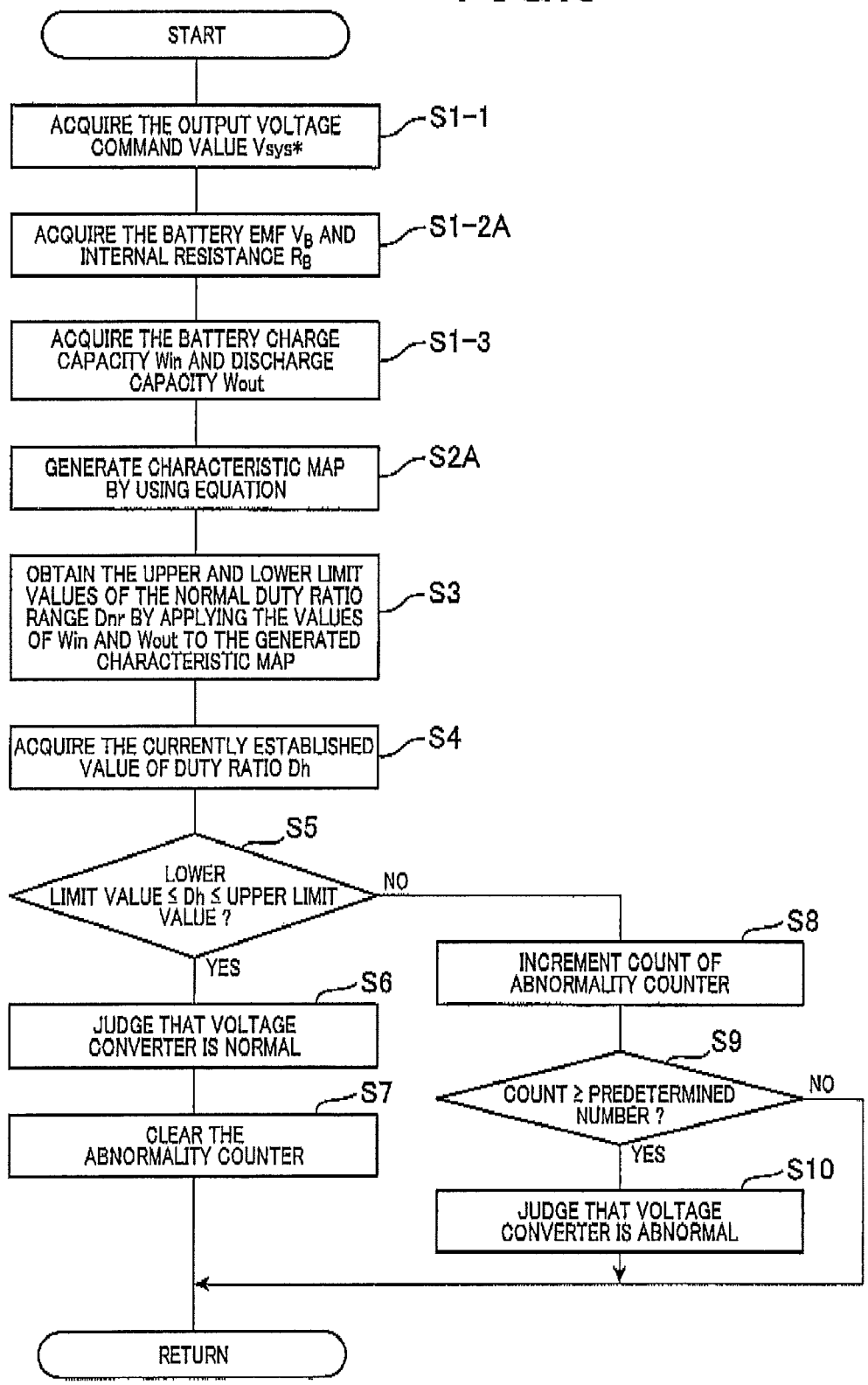
FIG. 5 is a flow diagram of abnormality detection processing that is executed with the first embodiment.

However it would alternatively be possible to ignore the possibility of such judgement errors, and to immediately judge that there is abnormality of the voltage converter 20 when a NO decision is reached in an execution of step S5 (i.e., with steps S7 to S9 of FIG. 5 being omitted).

With the first embodiment as described above, the abnormality detection section 60 of the voltage converter control apparatus 50 sets the normal duty ratio range based on a parabola that is expressed by equation (8) and is derived from the circuit of the voltage converter 20 and the values of EMF and internal resistance of the battery 1. When the values of duty ratio Dh successively outputted from the voltage step-up control section 55 remain continuously outside the normal duty ratio range Dnr for longer than a predetermined duration (predetermined number of executions of the judgement processing routine), it is judged that there is abnormality of the voltage converter 20.

In equation (8), instead of using the output-side voltage Vsys detected by the output voltage sensor 32, the output voltage command value Vsys* is utilized as output-side voltage information (i.e., information indicative of the output voltage of the voltage converter 20). Hence the abnormality judgement is not affected by errors in the values detected by the output voltage sensor 32 or by variations in the characteristics of the output voltage sensor 32, so that abnormality of the voltage converter 20 can be reliably detected.

Second Embodiment

The manner of setting the normal duty ratio range Dnr with a second embodiment will be described referring to FIGS. 6 to 8.

With the first embodiment, the normal duty ratio range Dnr is set based upon a parabola characteristic which expresses the relationship between the duty ratio Dh and the battery power ($P_B$). However the battery EMF ($V_B$) that is used in equation (8) to calculate the parabola is the value obtained when the voltage drop across the battery internal resistance $R_B$ is ideally zero. In practice, it is difficult to obtain the actual (current) values of the battery EMF and battery internal resistance. Hence with a practical apparatus, it is generally necessary to estimate values for $V_B$ and $R_B$ based upon some assumed conditions.

For that reason, it is desirable for the voltage converter control apparatus 50 to perform abnormality detection based upon information that is normally available, without requiring information concerning the battery EMF internal resistance.

Referring to FIG. 1, the input-side voltage Vin of the voltage converter 20 is expressed by equation (10) below.

$$V_{in}=V_B-R_B\times I_B \qquad (10)$$

During drive operation of the voltage converter 20, Vin<$V_B$ since the battery current $I_B$>0, while during regeneration operation, Vin>$V_B$ since $I_B$<0.

Equation (10) signifies that the input-side voltage value Vin incorporates information on the battery EMF ($V_B$) and internal resistance ($R_B$). Hence the voltage step-up control section 55 can use the detected value of input-side voltage Vin (necessarily required for calculating the forward feedback term duty_ff) instead of the battery EMF and internal resistance values.

Figure 6:
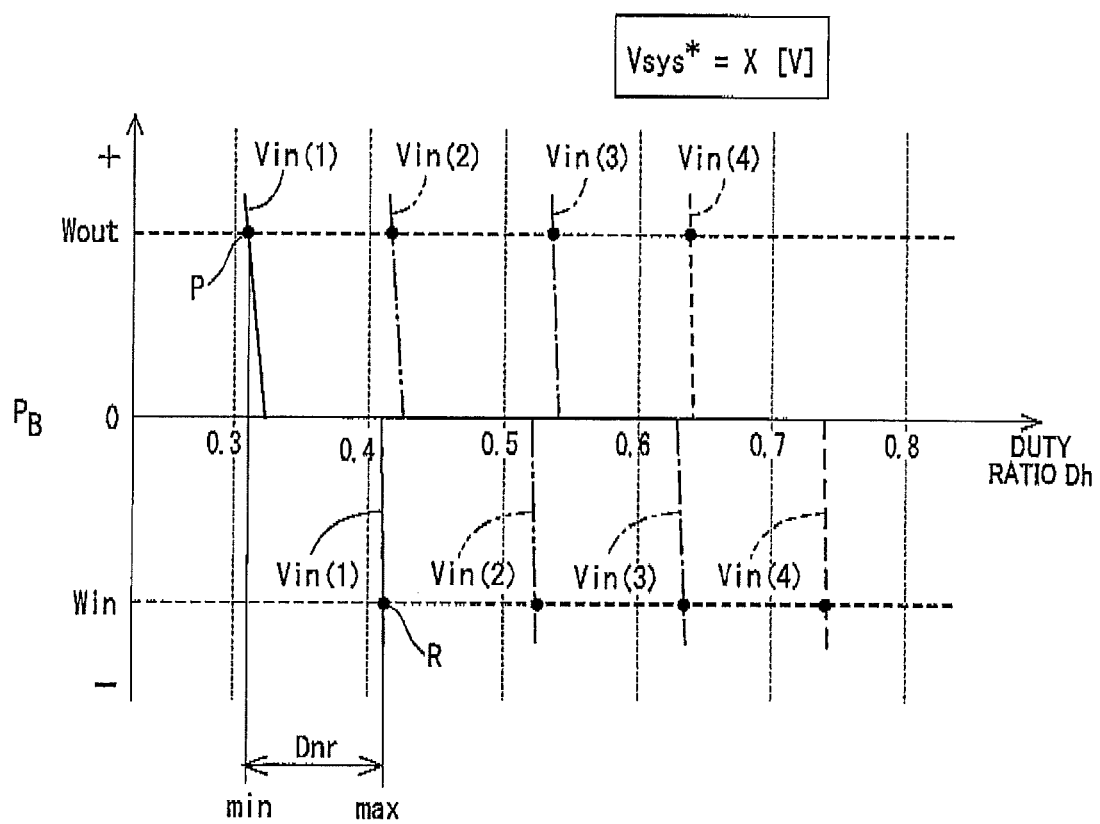
FIG. 6 is a characteristic map illustrating a normal duty ratio range and an input-side voltage/battery power/duty ratio relationship, with a second embodiment.

From results obtained by actual measurement and by computer simulation, for a specific output voltage command value Vsys* (indicated as X[V]), the characteristic map shown in FIG. 6 is obtained. This relates respective values of the input-side voltage Vin, the battery power ($P_B$) and the duty ratio Dh. With this embodiment a plurality of such characteristic maps are utilized, corresponding to respectively different output voltage command values.

In FIG. 6, the values of input-side voltage Vin designated as Vin(1), Vin(2), Vin(3), Vin(4), . . . successively increase, from Vin(1) as the lowest value. The higher the value of Vin, the higher become the corresponding duty ratio Dh. For any specific value of Vin, during drive operation ($P_B$>0), the corresponding value(s) of duty ratio Dh is smaller than during regeneration operation ($P_B$<0). Furthermore during both drive operation and regeneration operation, for any specific value of Vin, the amount of variation of the corresponding values of duty ratio Dh with respect to variation of the battery power $P_B$ is small (so that the respective characteristic segments corresponding to Vin(1)-Vin(4) in FIG. 6 are substantially vertical).

Hence with this embodiment, the limits of the normal duty ratio range Dnr are set as follows. For example when the input voltage value is Vin(1), the drive boundary point P (the intersection between the characteristic for Vin(1) and the allowable battery discharge power Wout during drive operation) is set as the lowest value (min) of the normal duty ratio range Dnr, while the regeneration boundary point R (the intersection between the characteristic for Vin(1) and the allowable battery charging power Win during regeneration operation) is set as the highest value (max) of the range Dnr. The normal duty ratio range Dnr is thereby determined (with respect to one specific value X[V] of Vsys*) when the input voltage value is Vin(1).

Hence with the second embodiment, the normal duty ratio range Dnr can be set without using a parabola characteristic as used with the first embodiment. The abnormality detection section 60 of this embodiment incorporates a non-volatile memory (not shown in the drawings) in which plurality of characteristic maps of the form shown in FIG. 6 are stored beforehand, corresponding to respectively different values of the output voltage command value Vsys*. By applying the currently acquired values of Vin, Wout and Win to such a characteristic map, selected in accordance with the current value of Vsys*, the corresponding normal duty ratio range Dnr is obtained.

As the output voltage command value Vsys* increases, the Pb-Vin characteristic segments shown in FIG. 6 shift accordingly overall, in a direction of decrease of the corresponding values of duty ratio Dh.

Figure 7:
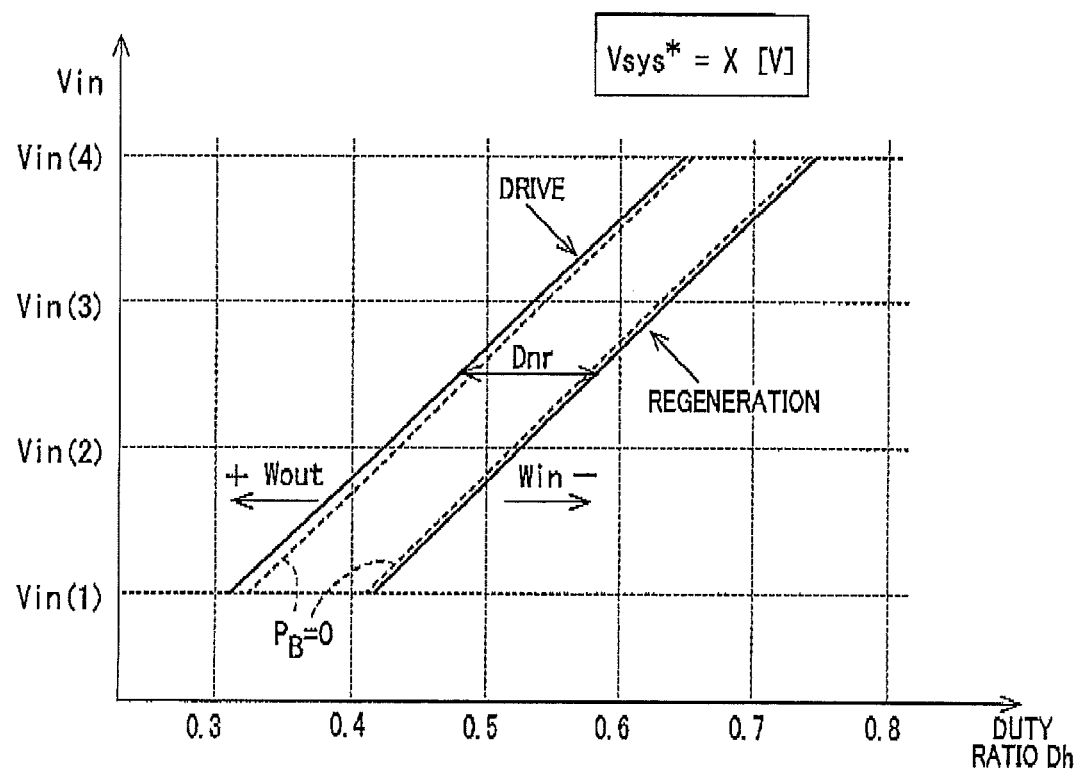
FIG. 7 is a characteristic map obtained by rearranging the characteristic map of FIG. 6, showing an input-side voltage/duty ratio relationship.

The relationship between values of the input-side voltage Vin and duty ratio Dh can be rearranged to the form of the characteristic map shown in FIG. 7 (as for FIG. 6, corresponding to one specific value of Vsys*). As shown, the smaller the allowable battery charging power Win, and the greater the allowable battery discharge power Wout, the wider becomes the normal duty ratio range Dnr. However since the amount of change of Dnr is small, variations in Win or Wout do not have a large effect.

Hence, to obtain an approximate normal duty ratio range Dnr, it would be possible to use predetermined fixed values for Wout and Win. In that case, the only information items required to be acquired are the command value Vsys* (for selecting the appropriate characteristic map), and the detected value of Vin.

Abnormality detection processing performed by the second embodiment will be described referring to the flow diagram of FIG. 8. Only points of difference from the processing of the first embodiment are described. Specifically, steps S1-2A and S2A of the flow diagram of FIG. 5 for the first embodiment are replaced by steps S1-2B and S2B respectively in the flow diagram of FIG. 8 for the second embodiment. In other respects, the processing of the second embodiment is similar to that of the first embodiment.

In step S1-2B, the value of the input-side voltage Vin that is being inputted to the voltage step-up control section 55 is acquired. In step S2B, one of a plurality of Pb-Vin-Dh characteristic maps (generated and stored beforehand as described above) each of the form shown in FIG. 6, is selected in accordance with the output voltage command value Vsys* (acquired in the preceding execution of step S1-1). The normal duty ratio range Dnr is then set, by applying the values of allowable battery charging power Win and allowable battery discharge power Wout (acquired in the preceding execution of step S1-3) and the currently detected value of the input-side voltage Vin, to the selected characteristic map. When the value of Vin is Vin(1) shown in FIG. 6, for example, the values of duty ratio Dh corresponding to the intersection points P, R are obtained. These constitute the upper and lower limit values of the normal duty ratio range Dnr.

As described above it would be possible to omit acquisition of the actual values of Win and Wout, if an approximate determination of the normal duty ratio range Dnr is sufficient. In practice, it is difficult to obtain the values of battery internal resistance $R_B$ and battery EMF $V_B$, as are required for setting the normal duty ratio range Dnr in the case of the first embodiment. However with the second embodiment, the currently detected value of the input-side voltage Vin is utilized instead of the values of $R_B$ and $V_B$. It is necessary to detect the input-side voltage Vin in any case (for the usual purpose of controlling the operation of the voltage converter 20). Hence the voltage converter control apparatus 50 of the second embodiment is more practical than that of the first embodiment, while providing similar effects to those of the first embodiment.

Third Embodiment

The manner of setting the normal duty ratio range Dnr with a third embodiment of the invention will be described referring to FIGS. 9 to 13.

With the second embodiment described above (to determine the normal duty ratio range Dnr accurately) it is necessary to acquire the input-side voltage Vin together with the values of allowable battery charging power Win and allowable battery discharge power Wout.

However it is necessary to take the possibility of sensor error (of the input voltage sensor) into consideration, since it may result in incorrect judgement that the duty ratio is erroneous. Furthermore, it may be difficult for the manufacturer of the voltage converter control apparatus 50 to obtain the values of allowable battery charging power Win and allowable battery discharge power Wout for the specific type of battery that is utilized.

For these reasons, the third embodiment enables the normal duty ratio range Dnr to be determined without requiring information concerning the input-side voltage Vin or Win and Wout.

The only information required by the abnormality detection section 60 of the third embodiment (i.e., which must be updated at each execution of an abnormality detection processing routine, in addition to the duty ratio Dh and output voltage command value Vsys*) is the value of power ($P_B$n) that is currently being supplied to/from the battery 1, and the highest value V_max and lowest value V_min that can be expected for the input-side voltage Vin of the voltage converter 20 when the battery (charge/discharge) power is zero, i.e., the highest and lowest values that could be expected for the battery EMF ($V_B$).

These limit values of Vin are used, in conjunction with the current value of battery power ($P_B$n) to calculate a range of possible values that can be reached by the input-side voltage Vin. That voltage range is referred to in the following as the "attainable Vin range" (corresponding to a specific value of battery power). It is derived based on a predetermined relationship between values of the battery power $P_B$ and the input-side voltage Vin (shown graphically in FIG. 9, described hereinafter). The attainable Vin range is then applied to a characteristic map shown in FIG. 12, (of the form of FIG. 7 of the second embodiment, relating values of Vin and duty ratio Dh for a specific output voltage command value Vsys*) to obtain the normal duty ratio range Dnr.

The relationship between values of battery power $P_B$ and input-side voltage Vin is derived as follows. Firstly, by modifying equation (10) above, the following equation (11) can be obtained.

$$I_B = \frac{V_B - Vin}{R_B} \qquad (11)$$

Equation (11) is of the form of equation (5) above, but with Vo replaced by Vin. Hence, by replacing Vo by Vin in equation (6), the following equation (12) can be obtained.

$$P_B = -\left(\frac{1}{R_B}\right) \times \left(Vin - \frac{V_B}{2}\right)^2 + \frac{V_B^2}{4R_B} \qquad (12)$$

Figure 9:
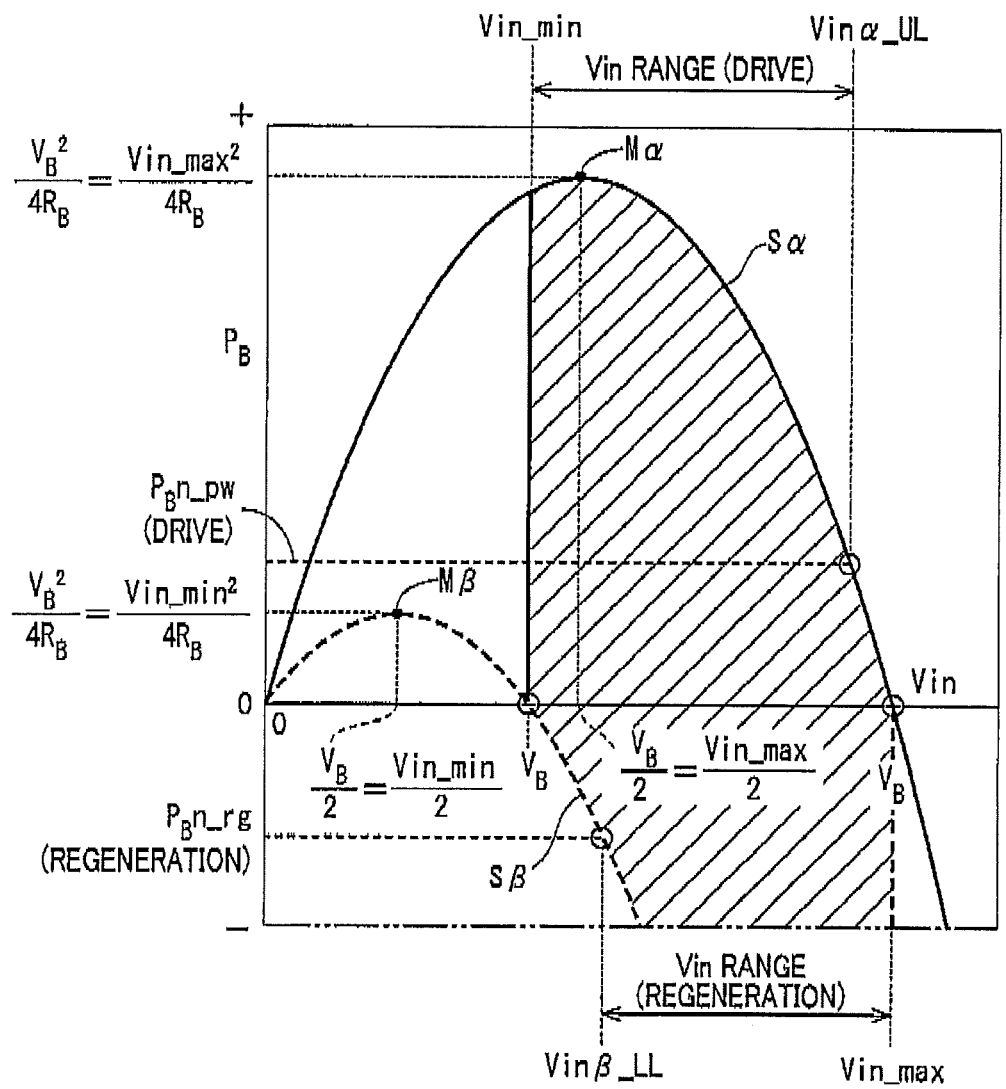
FIG. 9 is a diagram for use in describing the estimation of an "attainable input-side voltage" range based on an input-side voltage/battery power characteristic, with a third embodiment.

As shown in FIG. 9, when plotted with value of Vin along the horizontal axis and ($P_B$ along the vertical axis, the characteristic expressed by equation (12) is an upwardly protruding parabola. Specifically, two parabolas Sα, Sβ (Vin-$P_B$ characteristics) are obtained, respectively corresponding to drive operation ($P_B$>0) and to regeneration operation ($P_B$<0).

The coordinates of the apexes of the characteristics Sα, Sβ are expressed by equation (13) below, where ($V_B$ takes the value Vin_max in the case of characteristic Sα, and Vin_min in the case of characteristic Sβ.

$$M\left(\frac{V_B}{2}, \frac{V_B^2}{4R_B}\right) \qquad (13)$$

The minimum and maximum values (Vin_min and Vin_max) of the battery EMF $V_B$ are known values, e.g., as guaranteed by the battery manufacturer. Hence, Vin is within a known range (Vin_min to Vin_max) when the charge/discharge power of the battery is zero.

As shown in FIG. 9, at the charging boundary, Vin_max lies on the Sα characteristic, while at the discharge boundary, Vin_min lies on the Sβ characteristic.

The coordinates of the apex Mα of the Sα characteristic can be expressed by equation (14.1) below, obtained by inserting Vin_max as $V_B$ in equation (13). Similarly, the coordinates of the apex Mβ of the Sβ characteristic can be expressed by equation (14.2) below, obtained by inserting Vin_min as $V_B$ in equation (13).

$$M_\alpha\left(\frac{Vin\_max}{2}, \frac{Vin\_max^2}{4R_B}\right) \qquad (14.1)$$

$$M_\beta\left(\frac{Vin\_min}{2}, \frac{Vin\_min^2}{4R_B}\right) \qquad (14.2)$$

The cross-hatched region in FIG. 9 defines the limits of the attainable Vin ranges corresponding to respective values of battery power $P_B$ (as defined above). Specifically, for the case of drive operation ($P_B$>0) each value of input-side voltage Vinα of the cross-hatched region of the Sα characteristic is the upper limit value of the input-side voltage Vin, at a specific value of battery discharge power. Similarly for the case of regeneration operation ($P_B$<0), each value of input-side voltage Vin of the cross-hatched region of the Sβ characteristic is the lower limit value of Vin, at a specific value of battery charging power.

The value of battery power ($P_B$) at the current time, during drive operation, is designated as $P_B$n_pw in FIG. 9. Designating the intersection between the $P_B$n_pw and the Sα characteristic in the hatched-line region as Vinα_UL, the attainable Vin range during drive operation is estimated as being from Vin_min to Vinα_UL.

The current value of battery power $P_B$ during regeneration operation is designated as $P_B$n_rg. Designating the intersection between the $P_B$n_rg and the Sβ characteristic in the hatched-line region as Vinβ_LL, the attainable Vin range (at the value of battery power $P_B$n) during regeneration operation is estimated as being from Vinβ_LL to Vin_max.

As shown by equations (14.1), (14.2), the values of battery power respectively corresponding to the apexes of the Sα Vin-$P_B$ characteristic and the Sβ Vin-$P_B$ characteristic are dependent on the battery internal resistance $R_B$. However in practice, as described for the second embodiment, it may be difficult to obtain the value of $R_B$. Hence, some method of estimating that value is required.

Figure 10:
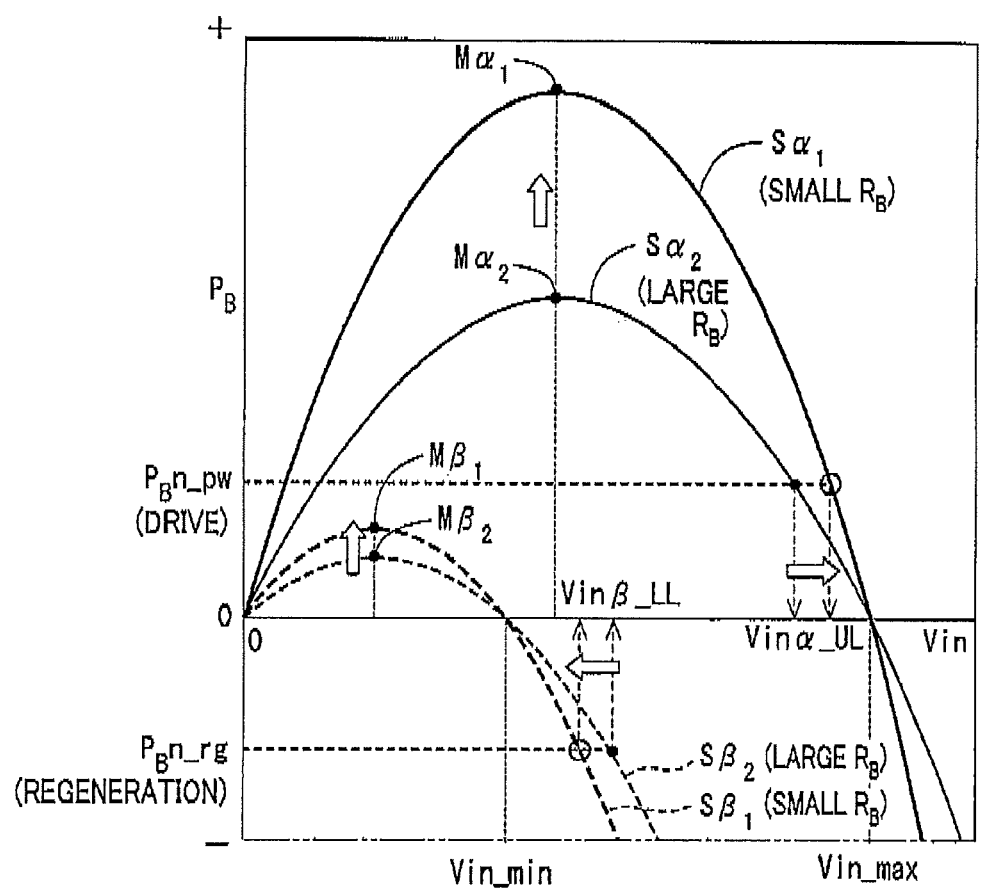
FIG. 10 is a diagram illustrating a relationship between the input-side voltage/battery power characteristic and values of battery internal resistance, with the third embodiment.

Vin-$P_B$ characteristics which are defined using two values of battery internal resistance $R_B$1 and $R_B$2 ($R_B$1<$R_B$2) are shown in FIG. 10. The characteristics are designated as Sα1 and Sα2 in the case of drive operation, having apexes Mα1, Mα2 respectively, and designated as Sβ1, Sβ2 in the case of regeneration operation, having apexes Mβ1, Mβ2 respectively.

The values of battery power ($P_B$) corresponding to the apexes Mα, Mβ are inversely proportional to the corresponding values of battery internal resistance $R_B$. Hence as shown in FIG. 10, the ($P_B$) coordinate of the apex Mα1 is greater than that of Mα2, so that the parabola characteristic Sα1 protrudes upward to a greater extent than the Sα2 characteristic. Similarly the ($P_B$) coordinate of the apex Mβ1 is greater than that of Mβ2, so that the parabola characteristic Sβ1 protrudes upward to a greater extent than the Sβ2 characteristic.

Hence with respect to drive operation, the greater the battery internal resistance $R_B$, the greater becomes Vinα_UL (value of Vin at the intersection between the $P_B$n_pw coordinate and the Pb-Vin characteristic Sα). During regeneration operation, the lower the battery internal resistance ($R_B$), the smaller becomes Vinβ_UL (value of Vin at the intersection between the $P_B$n_rg coordinate and the Pb-Vin characteristic Sβ).

Hence both during drive operation and during regeneration operation, the lower the value of battery internal resistance ($R_B$), the wider becomes the attainable Vin range, at the current value of battery power ($P_B$n). Thus from the aspect of ensuring that an abnormality will be detected only when it is sure that there actually is an abnormality, the assumed value of battery internal resistance $R_B$ should be the smallest that can be envisaged in practical operation.

Figure 11:
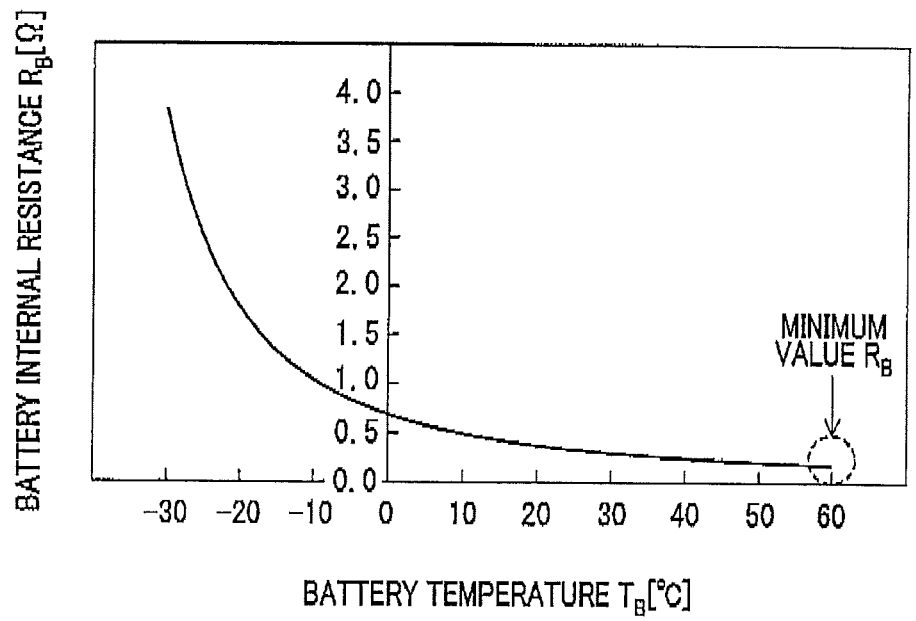
FIG. 11 is a graph showing a relationship between values of battery temperature and battery internal resistance.

The battery internal resistance $R_B$ varies inversely in proportion to the battery temperature $T_B$, so that the lowest value attained by the battery temperature will be reached when the battery temperature is at the maximum value attainable in practical use. This is illustrated in FIG. 11, in which a practical range of values of the battery temperature $T_B$ is assumed to be from −30° C. to 60° C. In view of this, and since the battery internal resistance ($R_B$) varies greatly with change of temperature, it is preferable (if the actual value of $T_B$ is not available) to define the Pb-Vin characteristics Sα, Sβ shown in FIG. 9 by using the lowest value of battery internal resistance expected to be reached within a practical range of battery temperature values.

However if the actual battery temperature $T_B$ can be monitored, the actual battery internal resistance $R_B$ can be estimated based on the temperature characteristic shown in FIG. 11. Even if the actual battery temperature $T_B$ cannot be accurately obtained, it may be possible to estimate that $T_B$ is within a specific range of temperatures. This might be done based for example on the temperature of the environment of the battery. In that case, the battery internal resistance $R_B$ can be specified as the value which corresponds to the lowest temperature within the estimated environmental temperature range. Furthermore, factors other than the battery temperature may affect the value of battery internal resistance, such as the state of charge (SOC) of the battery. It would be possible to also use such other factors as parameters in estimating the lowest value that might be expected for the battery internal resistance.

Figure 12:
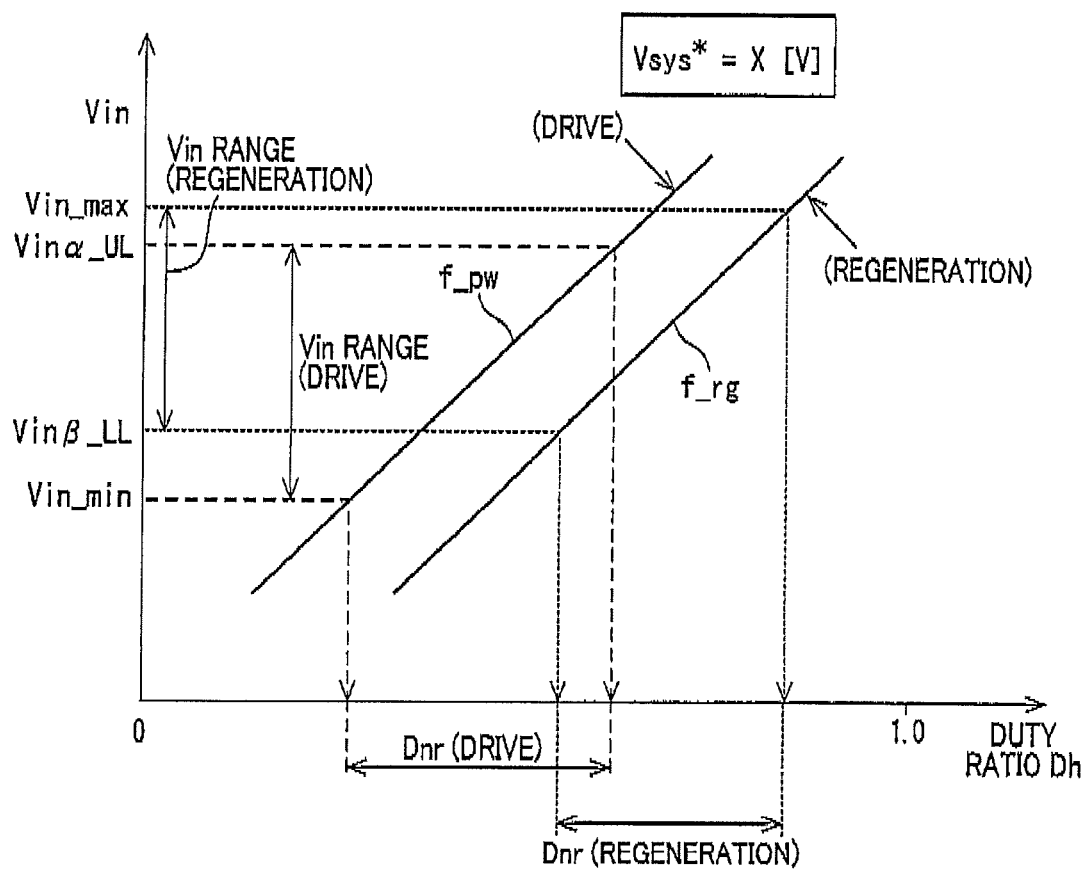
FIG. 12 is a diagram illustrating a manner of setting a normal duty ratio range based on an "attainable input-side voltage" range, with the third embodiment.

The manner of obtaining the normal duty ratio range Dnr with the third embodiment, based on the attainable Vin range, will be described referring to FIG. 12. As for FIG. 7 of the second embodiment, FIG. 12 is a Dh-Vin characteristic map, showing characteristics relating values of duty ratio Dh and input-side voltage Vin for the case of drive operation and regeneration operation respectively (the characteristics designated as f_pw and f_rg respectively), at a specific output voltage command value Vsys* (designated as X [V]). A plurality of such characteristic maps are generated and stored beforehand, corresponding to respectively different values of Vsys*. These Dh-Vin characteristic maps are generated as described for the second embodiment referring to FIGS. 6 and 7 above, but without acquiring and applying values of Win and Wout.

To determine the upper and lower limits of the normal duty ratio range Dnr during drive operation of the voltage converter 20, the attainable Vin range corresponding to the battery power value $P_B$n is first determined, i.e., the Vin_min and Vinα_UL limit values are obtained as described above. As shown in FIG. 12, these limit values are then applied to the f_pw characteristic of the Vin-Dh characteristic map that corresponds to the command value Vsys*, to obtain corresponding values of the duty ratio Dh as the upper and lower limit values of the normal duty ratio range Dnr, as illustrated in FIG. 12.

The normal duty ratio range Dnr is similarly determined in regeneration operation. In that case, the limit values Vinβ_LL and Vin_max of the attainable Vin range are applied to the f_rg characteristic.

Figure 8:
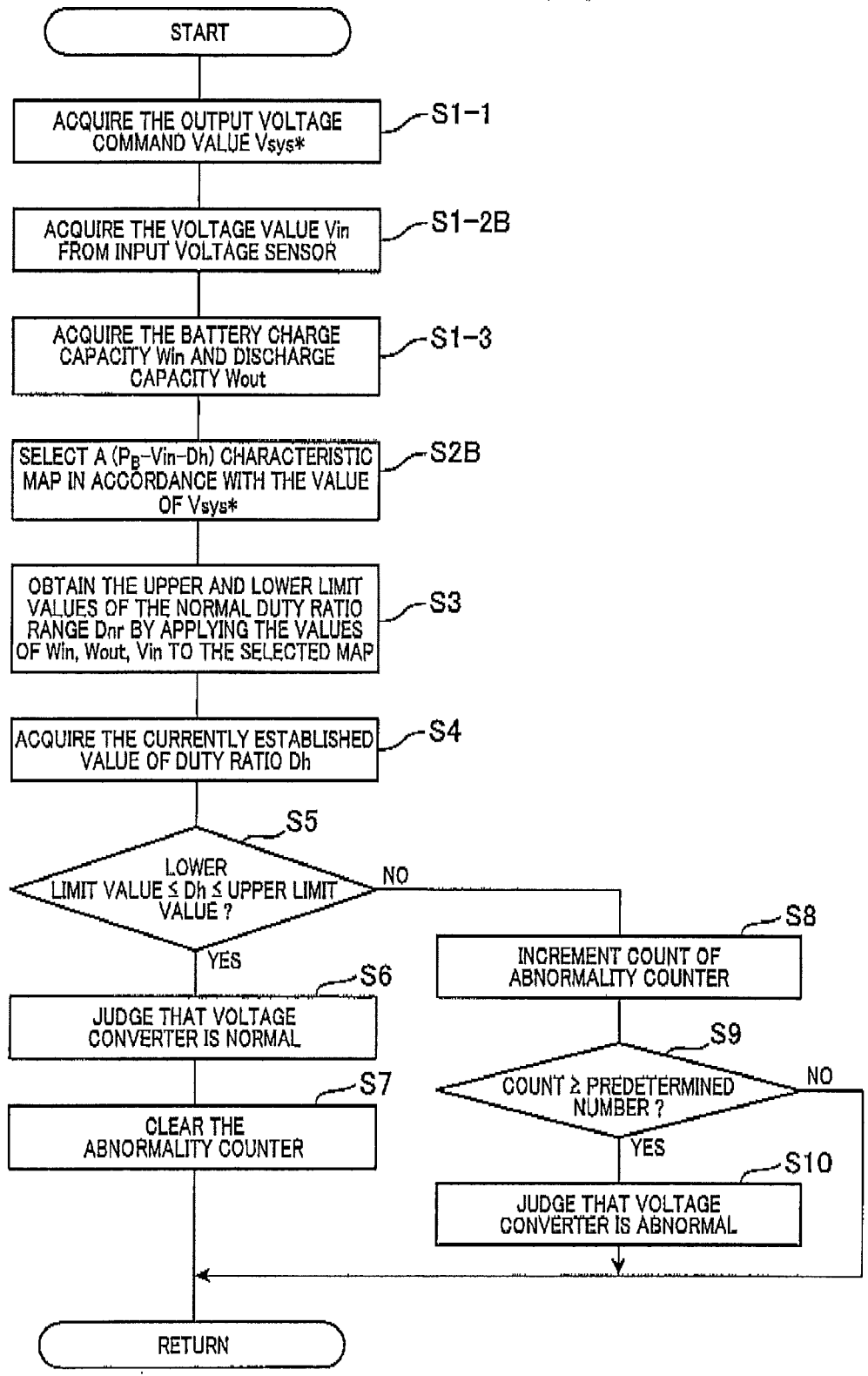
FIG. 8 is a flow diagram of abnormality detection processing that is executed with the second embodiment.
Figure 13:
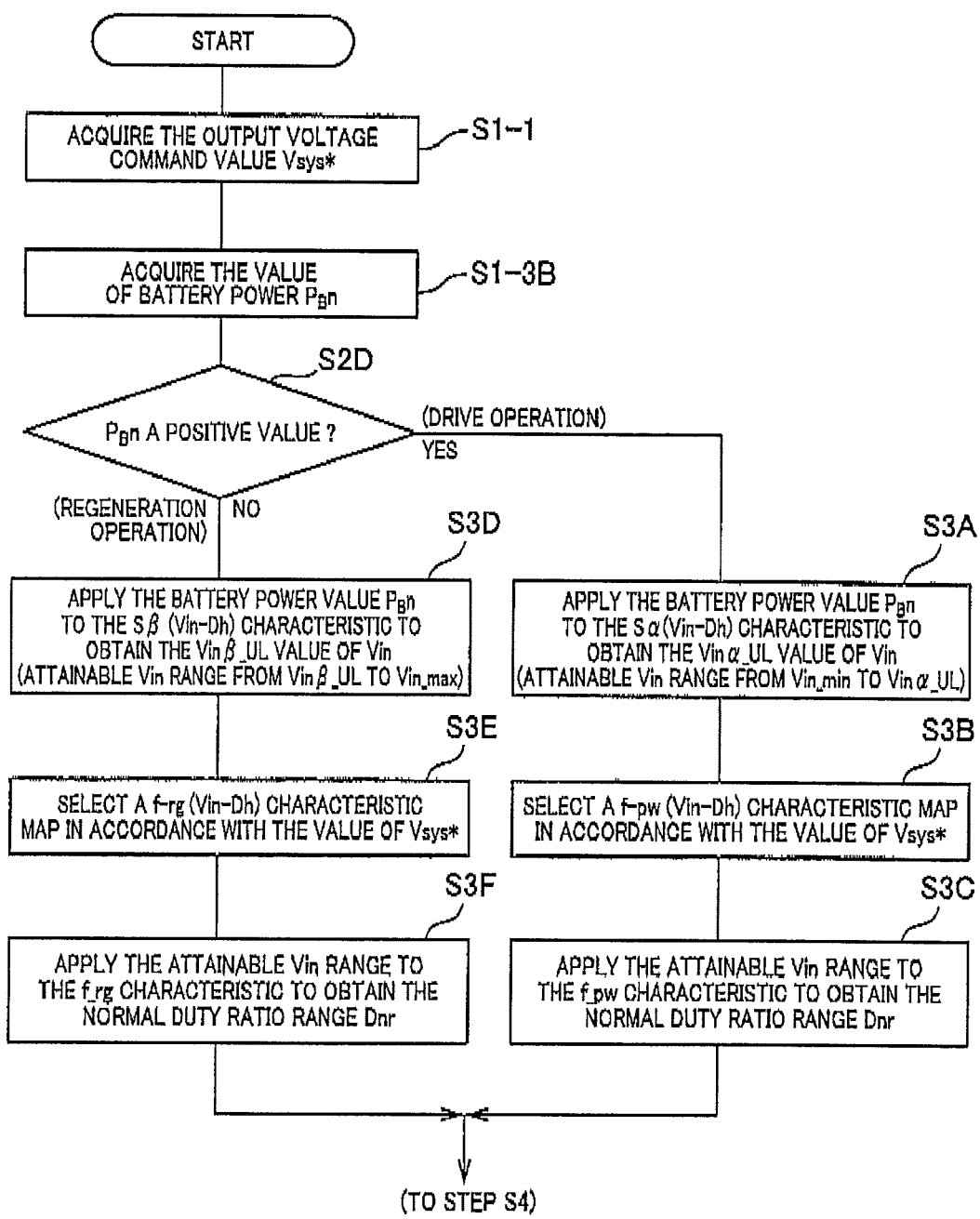
FIG. 13 is a flow diagram illustrating differences between abnormality detection processing executed with the third embodiment and that of the second embodiment.

FIG. 13 is a partial flow diagram of an abnormality detection processing routine executed by this embodiment. The basic differences between this processing and that of the second embodiment (shown in FIG. 8 above) are as follows:

Steps S1-2B, S1-3, S2-B and S3 of FIG. 8 are replaced by step S1-3B (acquisition of value of battery power $P_B$n), step S2-D and steps S3A to S3F.

In step S2-D a decision is made as to whether $P_B$n is a positive or negative value. If it is positive (indicating drive operation), steps S3A to S3C are executed to obtain the normal duty ratio range Dnr. If $P_B$n is negative (indicating regeneration operation), steps S3D to S3F are executed to obtain Dnr.

In step S3A the value of battery power $P_B$ n is applied to the Sα $P_B$-Vin characteristic shown in FIG. 9 to obtain the Vinα_UL value of Vin. In that case, the attainable Vin range is from Vin_min (the lowest possible value of Vin during drive operation) to Vinα_UL. In step S3B a f_pw characteristic map is selected in accordance with the value of Vsys* acquired in step S1-1. In step S3C, the attainable Vin range is applied to the selected f_pw characteristic as shown in FIG. 12, to obtain the normal duty ratio range Dnr.

In step S3D the value $P_B$n is applied to the Sβ $P_B$-Vin characteristic to obtain the Vinβ_LL value of Vin. In that case, the attainable Vin range is from Vinβ_LL to Vin_max (the highest possible value of Vin during regeneration operation). In step S3E a f_rg characteristic map is selected in accordance with the value of Vsys*. In step S3F, the attainable Vin range is applied to the f_rg characteristic to obtain the normal duty ratio range Dnr.

The subsequent steps, including and extending from step S4 (acquiring the duty ratio value), are identical to those of FIG. 8. It is assumed that a Sα, Sβ characteristic map of the form shown in FIG. 9, generated based on predetermined values of the battery internal resistance $R_B$, and on the values of Vin_min and Vin_max, has been prepared and stored beforehand for use in executing steps S3A and S3B. Alternatively, if an actual (currently monitored) value of the battery internal resistance $R_B$ can be acquired, that could be used to generate a Sα, Sβ characteristic map before executing steps S3A to S3C or S3D to S3F.

With the third embodiment as described above, two normal duty ratio ranges Dnr are determined, which are applied during drive operation and during operation of the voltage converter 20 respectively. Each normal duty ratio range can be accurately determined without requiring use of detected values of the input-side voltage Vin, so that the normal duty ratio ranges are determined without being affected by voltage sensor errors. In addition it is not necessary to obtain values of the allowable battery charging power Win and allowable battery discharge power Wout for the particular type (model) of battery that will be utilized, i.e., information which may be difficult for the manufacturer of the voltage converter control apparatus 50 to obtain.

Furthermore by defining the Vin-$P_B$ characteristics Sα, Sβ using the lowest value that can be expected for the battery internal resistance $R_B$, erroneous detection of abnormality of the voltage converter 20 can be effectively prevented.

Other Embodiments

The present invention is not limited in application to a voltage converter which executes step-up of an input voltage, but would be equally applicable to a step-down type of voltage converter. In that case, the voltage control section and the voltage conversion section of the voltage converter would consist of a voltage step-up control section and a voltage step-up section respectively, instead of the voltage step-up control section 55 and the voltage step-up section 22 of the above embodiments.

With the above embodiments, the load circuit of the voltage converter 20 converts a DC voltage to 3-phase AC voltage for driving a motor-generator 8. However the invention would be equally applicable to other types of load circuit, for example a H bridge circuit which drives a DC motor.

Furthermore, a single voltage converter 20 could be connected to a plurality of load circuits.

Furthermore the invention is not limited to the case in which the voltage converter drives a load circuit such as an power inverter, etc., which supplies electrical power to a motor-generator, for providing motive power to a hybrid type of vehicle or an electric vehicle. The invention could be equally applied when the electrical power is supplied to an auxiliary generator of a vehicle, or to a rotary machine used other than in vehicles, such as in railroad trains, etc. Furthermore the invention would be also applicable to equipment which utilizes high voltages, such as discharge tubes or X-ray machines, etc.

Hence the above description of embodiments is to be understood in a descriptive and not in a limiting sense, and various modifications of the embodiments could be envisaged which fall within the scope claimed for the invention, as set out in the appended claims.

What is claimed is:

1. A voltage converter control apparatus comprising a voltage step-up control section and an abnormality detection section for respectively controlling a voltage converter and detecting abnormal operation of the voltage converter, the voltage converter being connected between a battery and a power inverter, the voltage step-up control section controlling the voltage converter for executing conversion between a terminal voltage of the battery as an input-side voltage (Vin) and a terminal voltage of the power inverter as an output-side voltage (Vsys),
   the voltage converter comprising an inductor and a voltage step-up section connected in series between the battery and the power inverter, the voltage step-up section comprising switching elements controlled by the voltage step-up control section for on/off switching to repetitively store and discharge electrical energy into and from the inductor;
   the voltage step-up control section comprises circuitry configured to calculate a duty ratio of switching to be executed by the switching element, based on information including a command value (Vsys*) for an output voltage of the output-side voltage, and
   the abnormality detection section comprising circuitry configured to determine a normal duty ratio range (Dnr) as a range of values of the duty ratio, based on information indicative of the output-side voltage and information relating to the input-side voltage, and to detect that there is an abnormality in the voltage converter based on the normal duty ratio range (Dnr) in relation to duty ratio values calculated by the voltage step-up control section;
   wherein the voltage converter control apparatus is characterized in that:
   the circuitry of the abnormality detection section is configured to acquire the command value (Vsys*) for the output voltage, and to determine the normal duty ratio range (Dnr) based on a function of power of the battery and the command value (Vsys*) for the output voltage as the information indicative of the output-side voltage of the voltage converter.

2. The voltage converter control apparatus according to claim 1, wherein the voltage converter is selectively operable in a drive mode whereby electrical power discharged from the battery is supplied to the power inverter and in a regeneration mode whereby electrical power generated by the power inverter is supplied to charge the battery, and wherein the circuitry of the abnormality detection section is configured to:
   acquire respective values of a maximum allowable charging power (Win), maximum allowable discharge power (Wout), electromotive force (VB) and internal resistance (RB) of the battery,
   calculate a relationship between values of battery power (PB) of the battery, the command value (Vsys*) for the output voltage, and the duty ratio (Dh), by applying the following equation expressing a characteristic in the form of a parabola:

$$P_B = -\left(\frac{V_{sys^*}{}^2}{R_B}\right) \times \left(Dh - \frac{V_B}{2V_{sys^*}}\right)^2 + \frac{V_B^2}{4R_B}$$

and,
   determine the normal duty ratio range (Dnr) as a range that is higher than a duty ratio corresponding to an axis of the parabola and that corresponds to battery power values between the maximum allowable charging power (Win) value and the maximum allowable discharge power (Wout) value.

3. The voltage converter control apparatus according to claim 1 wherein the abnormality detection section:
   comprises a non-volatile memory having data stored therein beforehand expressing a plurality of characteristic maps corresponding to respectively different command values (Vsys*) for the output voltages, each of the characteristic maps expressing a relationship between values of the input-side voltage and the duty ratio; and
   comprises circuitry configured to acquire a currently detected value of the input-side voltage, select a one of the characteristic maps corresponding to a currently specified output voltage command value, and determine the normal duty ratio range (Dnr) based on the selected characteristic map in conjunction with the input-side voltage value.

4. The voltage converter control apparatus according to claim 3, wherein:

the abnormality detection section acquires respective values of an allowable battery charging power Win and an allowable battery discharge power (Wout) of the battery; and the normal duty ratio range (Dnr) is further determined based upon the values of allowable battery charging power Win and allowable battery discharge power (Wout).

5. The voltage converter control apparatus according to claim 1, wherein the abnormality detection section:

comprises a non-volatile memory having data stored therein beforehand expressing a plurality of characteristic maps corresponding to respectively different command values (Vsys*) for the output voltages, each of the characteristic maps expressing a relationship between the input-side voltage and the duty ratio value; and comprises circuitry configured to acquire a currently detected value of the battery power and respective values of an electromotive force (VB) and an internal resistance (RB) of the battery, select a one of the characteristic maps corresponding to a currently specified command value (Vsys*) for the output voltage, and apply the acquired value of battery power to the selected characteristic map to obtain a specific characteristic that relates values of the input-side voltage and the duty ratio, acquire a minimum possible value (Vin_min) and a maximum possible value (Vin_max) of the input-side voltage, estimate an attainable input voltage range, defined by maximum and minimum attainable values of the input-side voltage of the voltage converter at the currently detected value of the battery power, the estimation based on the minimum possible value (Vin_min) or the maximum possible value (Vin_max) and on a relationship between the battery power (PB), the battery electromotive force (VB), the battery internal resistance (RB) and the input-side voltage (Vin), expressed by the following equation:

$$P_B = -\left(\frac{1}{R_B}\right) \times \left(Vin - \frac{V_B}{2}\right)^2 + \frac{V_B^2}{4R_B}$$

and, determine the normal duty ratio range (Dnr) based on the attainable input voltage range in conjunction with the obtained specific characteristic.

6. The voltage converter control apparatus according to claim 5, wherein the voltage converter is selectively operable in a drive mode whereby electrical power discharged from the battery is supplied to the power inverter and in a regeneration mode whereby electrical power generated by the power inverter is supplied to charge the battery, a first specific characteristic, relating values of the input-side voltage and the duty ratio and corresponding to operation in the drive mode, is obtained from the selected characteristic map and utilized to determine the normal duty ratio range when the voltage converter is operating in the drive mode, and a second specific characteristic, relating values of the input-side voltage and the duty ratio and corresponding to operation in the regeneration mode, is obtained from the selected characteristic map and utilized to determine the normal duty ratio range when the voltage converter is operating in the regeneration mode.

* * * * *